US009396402B2

(12) United States Patent
Vardy (10) Patent No.: US 9,396,402 B2
(45) Date of Patent: Jul. 19, 2016

(54) SYSTEM AND METHODS FOR IDENTIFICATION AND FRAUD PREVENTION (71) Applicant: Terence Vardy, Tweed Heads (AU)

(72) Inventor: Terence Vardy, Tweed Heads (AU)

(73) Assignee: Terence Vardy, New South Wales (AU)

( * ) Notice: Subject to any disclaimer, the term of this patent is extended or adjusted under 35 U.S.C. 154(b) by 0 days.

(21) Appl. No.: 14/434,471

(22) PCT Filed: Oct. 9, 2013

(86) PCT No.: PCT/AU2013/001167
§ 371 (c)(1),
(2) Date: Apr. 9, 2015

(87) PCT Pub. No.: WO2014/056032
PCT Pub. Date: Apr. 17, 2014

(65) Prior Publication Data
US 2015/0269452 A1   Sep. 24, 2015

(30) Foreign Application Priority Data

Oct. 9, 2012  (AU) ................................ 2012904407

(51) Int. Cl.
*G06K 9/00* (2006.01)
*G06T 7/00* (2006.01)
(52) U.S. Cl.
CPC .......... *G06K 9/00885* (2013.01); *G06T 7/0044* (2013.01); *G06K 2009/00932* (2013.01)

(58) Field of Classification Search
None
See application file for complete search history.

(56) References Cited

U.S. PATENT DOCUMENTS

| 5,787,185 | A  | * | 7/1998  | Clayden  | A61B 5/117 382/115 |
| 2004/0041690 | A1 | * | 3/2004  | Yamagishi | G07C 9/00563 340/5.52 |
| 2004/0230488 | A1 | * | 11/2004 | Beenau   | G06K 9/00 705/18 |
| 2006/0095491 | A1 | * | 5/2006  | Abe      | G06F 17/142 708/400 |
| 2006/0177107 | A1 |   | 8/2006  | Ishii    |  |

(Continued)

FOREIGN PATENT DOCUMENTS

EP      1739592 B1    10/2009

OTHER PUBLICATIONS

WO 2011/051230 to Morin et al., published May 5, 2011, with Google Machine English Translation included.*

(Continued)

*Primary Examiner* — Aaron W Carter
(74) *Attorney, Agent, or Firm* — Meunier Carlin & Curfman LLC (57) ABSTRACT A system and method for authenticating the identity of a subject from a plurality of subjects. The system utilizes a scanner and processor for mapping locations of blood vessels and running a comparison between images to identify the subject based on the type and location of the subject's blood vessels.

14 Claims, 8 Drawing Sheets

(56) References Cited

U.S. PATENT DOCUMENTS

| | | | | |
|---|---|---|---|---|
| 2006/0178580 A1* | 8/2006 | Nakamura | ............... | A61B 8/06 600/438 |
| 2007/0041620 A1* | 2/2007 | Ito | ............................ | G06K 9/00 382/115 |
| 2007/0177771 A1* | 8/2007 | Tanaka | ................... | A61B 5/117 382/115 |
| 2008/0107309 A1* | 5/2008 | Cerni | ................. | G06K 9/00033 382/115 |
| 2008/0298642 A1* | 12/2008 | Meenen | ................... | G06K 9/00 382/115 |
| 2009/0171827 A1* | 7/2009 | Callahan | ............... | G06Q 20/042 705/35 |
| 2010/0263044 A1* | 10/2010 | Yamada | ................ | G06F 3/1222 726/17 |
| 2011/0026783 A1* | 2/2011 | Fujii | ....................... | A61B 5/117 382/124 |
| 2011/0102141 A1* | 5/2011 | Wu | ................... | G06K 19/06187 340/5.82 |
| 2012/0079273 A1* | 3/2012 | Bacchiaz | ............ | G07C 9/00087 713/168 |
| 2013/0006112 A1* | 1/2013 | Vardy | ................. | A61B 5/0059 600/443 |
| 2013/0339242 A1* | 12/2013 | McHugh | ................ | G06Q 20/40 705/44 |

OTHER PUBLICATIONS

International Search Report and Written Opinion of the AU International Searching Authority, issued in related application PCT/AU2013/001167 on Jan. 13, 2014.

* cited by examiner

SYSTEM AND METHODS FOR IDENTIFICATION AND FRAUD PREVENTION

TECHNICAL FIELD

The present invention relates to a system and method for identification and fraud prevention. In particular, although not exclusively, the present invention relates to a system and methods for identification and fraud prevention utilising multiple biometric patterns of an individual subject/person.

BACKGROUND ART

Biometrics have been successfully utilised as a means for identifying an individual. At present, there are a number of methods employed for biometric identification of individuals. One of the oldest techniques is that of matching dental records or bite impressions for a given individual. While this technique is effective, its application is somewhat limited. Typically, the use of technique requires the Subject to provide a bite sample or the subject to be deceased to enable comparison of their teeth with dental records. In addition, the accuracy of the method can be affected in cases where an individual has had dental work performed without a record being kept of the work.

Another form of biometric identification which is popular and has a well established history is print identification. Traditionally, the technique has involved recording an image of the fingerprint, handprint, footprint by inking the relevant area and making an impression of the print on paper (template image). The patterns in the print formed by the individual's minutiae are then compared against a sample to determine a match with the template print. More recently, print analysis has gone digital; this has allowed print recognition to be utilised in a number of security applications to verify the identity of users prior to granting them access to system, building, etc. One of the most popular forms of print recognition for digital security and identification systems is fingerprint recognition.

One of the most critical steps in automated fingerprint authentication system is acquisition of the image of the print, as it determines the final fingerprint image quality, which has a drastic effect on the overall system performance. There are different types of fingerprint readers on the market, but the basic idea behind each is to measure the physical difference between ridges and valleys.

The procedure for capturing a fingerprint using a sensor consists of rolling or touching with the finger onto a sensing area, which according to the physical principle in use (optical, ultrasonic, capacitive or thermal) captures the difference between valleys and ridges. Once the image is captured, it then undergoes smoothing; a binary image of the print is then generated. The binary image then undergoes thinning to further sharpen the image. Once the thinning process is complete, the ridge reconstruction is performed. The further processing of the image to produce a template image is dictated based on the image recognition technique being utilised.

Presently, there are two main forms of template recognition techniques utilising pattern matching and minutiae feature matching. With pattern-based algorithms, the template contains the type, size and orientation of patterns within the aligned fingerprint image. The candidate fingerprint image is graphically compared with the template to determine the degree to which they match. Minutiae feature matching analyses the geometric characteristics such as distance and angle between standard minutiae and its neighbouring minutiae based on the analysis of the image-processed feature data. After the analysis, all the minutiae pairs have some kind of geometric relationship with their neighbouring minutiae, and the relationship will be used as basic information for local similarity measurement One of the problems associated with fingerprint scanning is that when a finger touches or rolls onto a surface, the elastic skin deforms. The quantity and direction of the pressure applied by the user, the skin conditions—wear due to manual labour, age, chemotherapy—and the projection of an irregular 3D object (the finger) onto a 2D flat plane introduce distortions, noise and inconsistencies in the captured fingerprint image. These problems result in inconsistent, irreproducible and non-uniform irregularities in the image. During each acquisition, therefore, the results of the imaging are different and uncontrollable. The representation of the same fingerprint changes every time the finger is placed on the sensor plate, increasing the complexity of any attempt to match fingerprints, impairing the system performance and consequently reliability.

In addition to the potential performance and accuracy issues posed by image acquisition, it is possible to fool fingerprint readers through various means i.e. false prints made from an image of a fingerprint. More recently, the television series 'Mythbusters' found a way to convert fingerprints lifted from the hand to a photographic form that the sensor would accept. For obvious reasons, they refuse to reveal the technique.

Another popular form of biometric recognition is that of iris recognition. With this process, an image of the eye is captured. The iris-recognition algorithm then localizes the inner and outer boundaries of the iris (pupil and limbus) in the image. Further subroutines detect and exclude eyelids, eyelashes, and specular reflections that often occlude parts of the iris. The set of pixels containing only the iris is then normalized by a rubber-sheet model to compensate for pupil dilation or constriction. The normalised image is then analysed to extract a bit pattern encoding the information needed to compare the capture image with a template image constructed for the individual. In the case of Daugman's algorithms, a Gabor wavelet transform is used. The result is a set of complex numbers that carry local amplitude and phase information about the iris pattern. In Daugman's algorithms, most amplitude information is discarded, and the 2048 bits representing an iris pattern consist of phase information. Discarding the amplitude information ensures that the template remains largely unaffected by changes in illumination or camera gain, and contributes to the long-term usability of the biometric template. For identification or verification, a template created by imaging an iris is compared to stored template(s) in a database. If the Hamming distance is below the decision threshold, a positive identification has effectively been made because of the statistical extreme improbability that two different persons could agree by chance ("collide") in so many bits, given the high entropy of iris templates.

As in the case of fingerprint recognition, iris recognition systems have a number of faults. Many commercial iris scanners can be easily fooled by a high quality image of an iris or face in place of the real thing. The scanners are often difficult to adjust and can become challenging for multiple people of different heights to use in succession. The accuracy of scanners can be affected by changes in lighting, dark brown irises, and restricted population patterns. Iris recognition is very difficult to perform at a distance larger than a close distance—less than 1 meter—and additionally if the person to be identified is not cooperating by holding the head still and looking into the camera. However, several academic institutions and biometric vendors are developing products that claim to be able to identify subjects at distances of up to 10 meters ("standoff iris" or "iris at a distance" as well as "iris on the move" for persons walking at speeds up to 1 meter/sec). As with other photographic biometric technologies, iris recognition is susceptible to poor image quality, with associated failure rates in enrollment. Researchers have tricked iris scanners using images generated from digital codes of stored irises. Criminals could exploit this flaw to steal the identities of other people.

Clearly, it would be advantageous to provide an apparatus, system and method which would mitigate the risks associated with falsification of biometric information for the misappropriation of personal data. It would also be advantageous to provide a system and method of identification that would reduce the likelihood of false positives or misreads during the identification process.

SUMMARY OF INVENTION

In a preferred aspect, the present invention is directed to a system for biometrically authenticating the identity of a subject from a plurality of subjects. The system comprises at least one scanner, the scanner for capturing information relating to a first blood vessel type and a second blood vessel type within regions of interest on each subject. The system further includes at least one processor coupled to the scanner wherein at least one processor is adapted to: map the locations of the first and second blood vessel types within the area of interest to produce a template image of the region of interest for each subject wherein each template image includes information on the locations of the first and second blood vessel types for the subject. The processor is further configured to: receive from the at least one scanner sample data obtained from a region of interest on a subject; locate the positions of a first blood vessel type and a second blood vessel type within the region of interest; generate a sample image of the area of interest including the positions of the first blood vessel type and the second blood vessel type within area of interest; and compare the positions of the first blood vessel type and the second blood vessel type of the sample image with the positions of the first vessel type and the second blood vessel type of each template image to verify the identity of the subject.

Suitably the scanner includes at least one infrared source for directing infrared radiation toward the region of interest and at least one infrared sensor for receiving infrared radiation reflected from said region of interest. The infrared source may be an infrared light source which is preferably omnidirectional, provided from a plurality of directions, and/or diffused. Suitably the infrared sensor detects infrared radiation reflected from the subject's tissues.

The scanner may also include at least one ultrasonic transducer for directing ultrasonic energy towards the region of interest and at least one acoustic sensor for receiving ultrasonic energy reflected from said region of interest.

Preferably the ultrasound portion comprises at least one ultrasonic transducer. Preferably the ultrasound portion comprises an array of ultrasonic transducers. In use, preferably the ultrasound portion transmits at least one beam of pulsed ultrasonic energy in the direction of the area of interest. Preferably a plurality of beams is transmitted towards the portion of the body and, even more preferably, at different angles relative to the area of interest.

Preferably at least one processor is adapted to determine the locations of vessels of the first vessel type within the area of interest based on the reflected infrared radiation and determine the locations of vessels of a second vessel type within the area of interest based on the reflected ultrasonic energy.

Suitably the processor is adapted to determine the positions of the first vessel type based on the level of infrared radiation absorbed by the first vessel type (i.e. first vessel type has less reflectivity and scattering effects). Most preferably the information on the infrared absorption patterns in the area of interest is utilised to identify venous vessels.

Preferably the processor is adapted to determine the positions of the second vessel type on the basis of fluid flow through the vessels. The second set of vessels may be located utilising ultrasound by measuring the blood flow of at least some of the vessels in the portion of the body e.g. the dorsal surface of the hand, and thereby locating the vessels by noting the measured pattern of fluid flows located therein. Suitably the second vessel types are designated as the vessels having the higher rate of fluid flow. Preferably the information obtained from the ultrasound is used to identify arterial vessels—arteries and arterioles.

The processor may also be configured to distinguish between the first and second vessel types based on the direction of the fluid flow within the vessels. Suitably the direction of the fluid flow within the vessels may be determined utilising Doppler frequency shift detection. Range gating techniques may also be applied to ascertain the blood velocity relationship to the cross-sectional dimensions of a vessel.

Suitably the process of comparing the sample image and the template images involves pattern matching. Suitably the identity of the subject is determined on the basis of a correlation between the sample image being above a pre-set threshold value. Most preferably the identification of a subject is on the basis of a 1 to 1 correlation between the sample image and the template image.

In one embodiment of the present invention, the system may be an access system for a secure site. In such instances, the processor may be coupled to a number of auxiliary systems such as an electronic door lock, security alarms and monitors, or the like. In such instances, the processor may be further configured on verifying the identity of the subject to release/actuate the auxiliary systems to provide access of the subject to the secure site. This may be typically utilised for prison situations and military applications. Identification of a hospital patient solely by their vein/artery pattern would allow rapid and effective treatment intervention and the sharing of their medical history for effective medical treatment.

In some embodiments of the present invention, the system may be utilised as part of a point of sale system. In such instances, a plurality of scanners may be positioned at various retail establishments within the system and the processor may be configured to communicate with the retailer's payment gateway to verify the identity of the subject prior to commencement of a transaction between the payment gateway and the subject's financial institution.

In one embodiment, the system may utilise an application for installation onto a subject's computing device such as a desk top computer, laptop, palm top, tablet pc, smart phone or the like. In such instances, the application may tether the computing device to the scanner to obtain an image data required by the system to facilitate the identification of the subject.

The system may in some embodiments provide additional layers of security. For example, the system may issue each subject on enrollment with the system a secure identification number which the subject is required to input when accessing the system. In addition, the system may send a message to the subject as they attempt access to the system, the subject being required to respond to the message before further processing of the subject takes place. Alternatively, the system may be configured to send out messages on a random basis to subjects. In the event that the subjects do not respond, the system may suspend the subject's access to the system.

In some embodiments of the present invention, the system may, on determining a mismatch in the data presented by a subject and that stored on the system, suspend the subject's access to the system and request that they submit themselves to a secondary identification procedure. In some forms of the invention, the request for the subject to submit themselves to a secondary identification procedure may be made after a pre-set number of retries to access the system. Traffic patterns for an individual may be documented for scrutiny based on access patterns.

Throughout the specification it is to be understood that the term 'infrared' is utilised to refer to electromagnetic radiation occurring in the infrared bands of the electromagnetic spectrum and is intended to include near-infrared, short-wave infrared, mid-wave infrared, long-wave infrared and far-infrared bands.

The reference to any prior art in this specification is not, and should not be taken as an acknowledgement or any form of suggestion that the prior art forms part of the common general knowledge.

BRIEF DESCRIPTION OF DRAWINGS

In order that this invention may be more readily understood and put into practical effect, reference will now be made to the accompanying drawings, which illustrate preferred embodiments of the invention, and wherein.

DESCRIPTION OF EMBODIMENTS

Figure 1A:
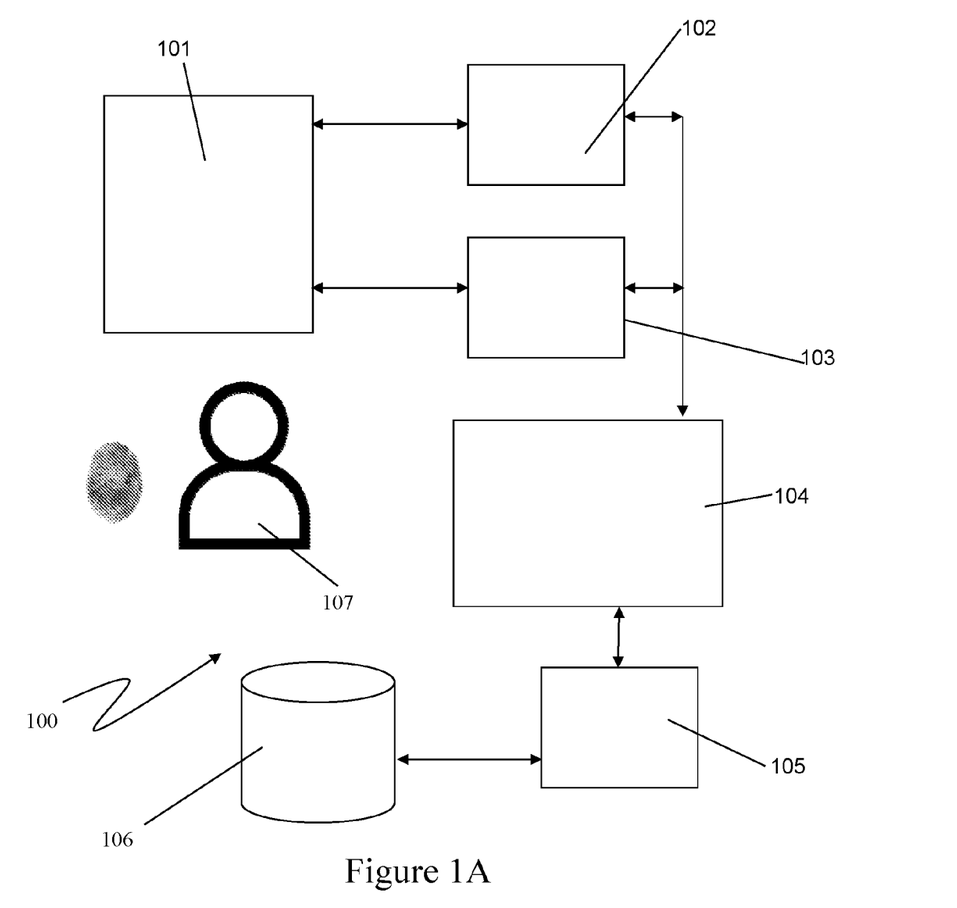
FIG. 1A is a schematic diagram of a biometric scanner according to one embodiment of the present invention.

With reference to FIG. 1, there is illustrated one possible configuration of a biometric scanner 100 according to one embodiment of the present invention. As shown, the scanner 100 includes a sample input 101 typically in the form of a plate or the like onto which a user 107 is required to place their palm, finger, etc. (sampled region) onto the plate or in close proximity to the plate for scanning. The biometric information in this instance is obtained via the use of an infrared or near infrared scanner 102 and ultrasonic scanner 103.

In this particular example, the scanner is configured to identify two differing tissue types. In this case, the infrared or near infrared scanner 102 is utilised to identify a first vessel type (vein) while the ultrasonic scanner 103 is used to identify a second vessel type (arteriole). More specifically, the infrared or near infrared scanner 102 is utilised to locate venous vessels (i.e. veins) and the ultrasonic scanner 103 is utilised to identify arterial vessels (i.e. arteries/arterioles) within the sampled region. Absolute identification of the individual is preferably based on the supplied by the biometric information obtained via the use of an infrared or near infrared scanner 102 and ultrasonic scanner 103. However, it will of course be appreciated by those of skill in the art that the biometric scanner may also include an array of secondary security measures such as additional biometric sampling devices, i.e., fingerprint reader, iris scanner, camera for facial recognition, etc. and physical devices such as a keypad, RFID or identity card swipe to integrate with existing identification/verification systems.

Once the scan of the sample area is complete, the information obtained from each scanner is passed to processor 104 for analysis. The processor 104 may be configured to pre-process the information for each scanner to form images of the paths of the venous vessels and arterial vessels within the sampled area. The two images can then be combined to form a vessel map for the sampled area. The processor 104 may then compare the map against a template map for the given individual which is stored in database 106.

In this example, the database is shown as being remote from the processor 104. Consequently, the biometric scanner 100 preferably includes a communications module 105 coupled to the processor enabling the scanner to communicate with the database 106. In such instances, the device could be configured to send the scanned data to a third party system for further processing and comparison.

Figure 1B:
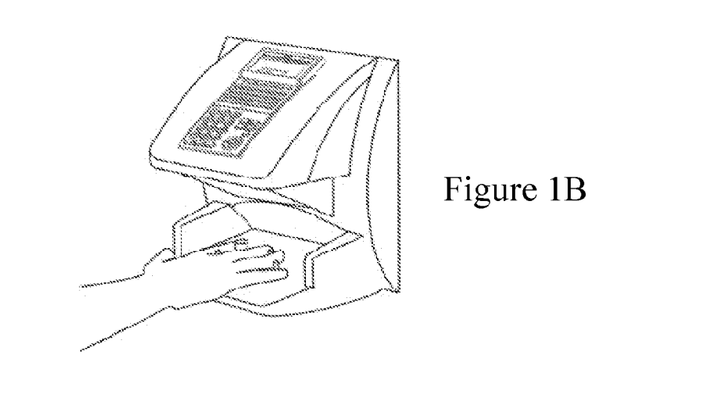
FIG. 1B is a pictorial representation of the biometric scanner of FIG. 1A.

FIG. 1B depicts one possible implementation of the biometric scanner. In this case the scanner is a single unit housing the infrared or near infrared scanner 102 and the ultrasonic scanner 103. The device in this instance preferably includes a proximity sensor to initiate capture when the hand is in the correct location. As can be seen in the example of the device 100 shown in 1B, the device has been configured with secondary security measures; in this case a card scan unit and keypad for entry of a pin code.

While in the above example the device is fitted with on-board processing, it will of course be appreciated by those of skill in the art that the captured data may be processed remotely from the capture device. For instance, the device 100 could forward the captured data to a back end computing system for processing or to a portable computing device such as a smartphone, tablet pc, netbook, etc. In such cases the transfer of the data could be via a dedicated link such as a LAN or direct link cable or via a wireless link using a suitable wireless protocol such as Bluetooth, 802.11b, 802.11g, 802.11n, etc. Where a portable computing device is utilised for the processing of the biometric information, the portable computing device may be fitted/coupled with a secondary security measure such as a portable fingerprint reader, card swipe, etc. Additionally auxiliary equipment such as the portable computing device's camera (if fitted), microphone, etc. may be utilised to obtain additional biometric samples. In some instance the device's camera may be used to read coded information such as barcodes or the like on ID cards, etc.

It will of course be appreciated by those of skill in the art that depending on the application, the template data for users along with other user information, e.g., ID number, access codes (PINS) secondary biometric data fingerprint templates, iris templates, etc. could be stored to a memory within the biometric scanner and the comparison conducted locally to verify the identity of the individual; thus enabling independent operation of the device from the main system. This may be useful in instances where the device is unable to access the database, allowing registered users access and permitting the enrollment of new users until such time that access to the database becomes available and updating can be commenced.

Alternatively, the individual could be required to insert a smart card into the scanner bearing their template image. In such instances, the card would activate the scanner for image acquisition. The processor would then compare the captured images against the data stored on the card. In addition to the insertion of the card, the individual may be required to enter in a pin code or the like to commence the scan, the pin code being utilised to active the card data.

As with fingerprints and iris patterns, vein and artery patterns are unique to the individual. As noted above, biometric systems based on fingerprints can be fooled with a dummy finger fitted with a copied fingerprint; voice and facial characteristic-based systems can be fooled by recordings and high-resolution images. The vessel identification system is much harder to fool as authentication can only be carried out on living tissue (i.e. blood flow must be present to obtain the image). Indeed, vein recognition has emerged as one of the fastest emerging biometric verification techniques as it offers an exceedingly low false rejection rate of approximately 0.01% and a false acceptance rate of 0.0001%. However, at present, it is not considered as reliable as more established technique of fingerprinting, etc.

Applicant has found that by utilising the ultrasonic scanner to identify the arterial vessels, at least a two-stage verification process can be performed to verify the identity of the individual. Thus, in cases where one vein pattern of an individual closely resembles that of another, it is possible to distinguish the two by utilising arterial patterns as an additional measurement. The different methods of detecting the position of veins and arteries are used by the inventor mainly due to the difference in the absorptive spectra of veins and arteries. Typically, veins are at a lower temperature than arteries and, therefore, will normally absorb a higher level of infrared spectra when compared to arteries which are often at a temperature which is very similar to that of the surrounding tissues rendering an infrared location mechanism for arterial vessels less reliable.

Figure 2:
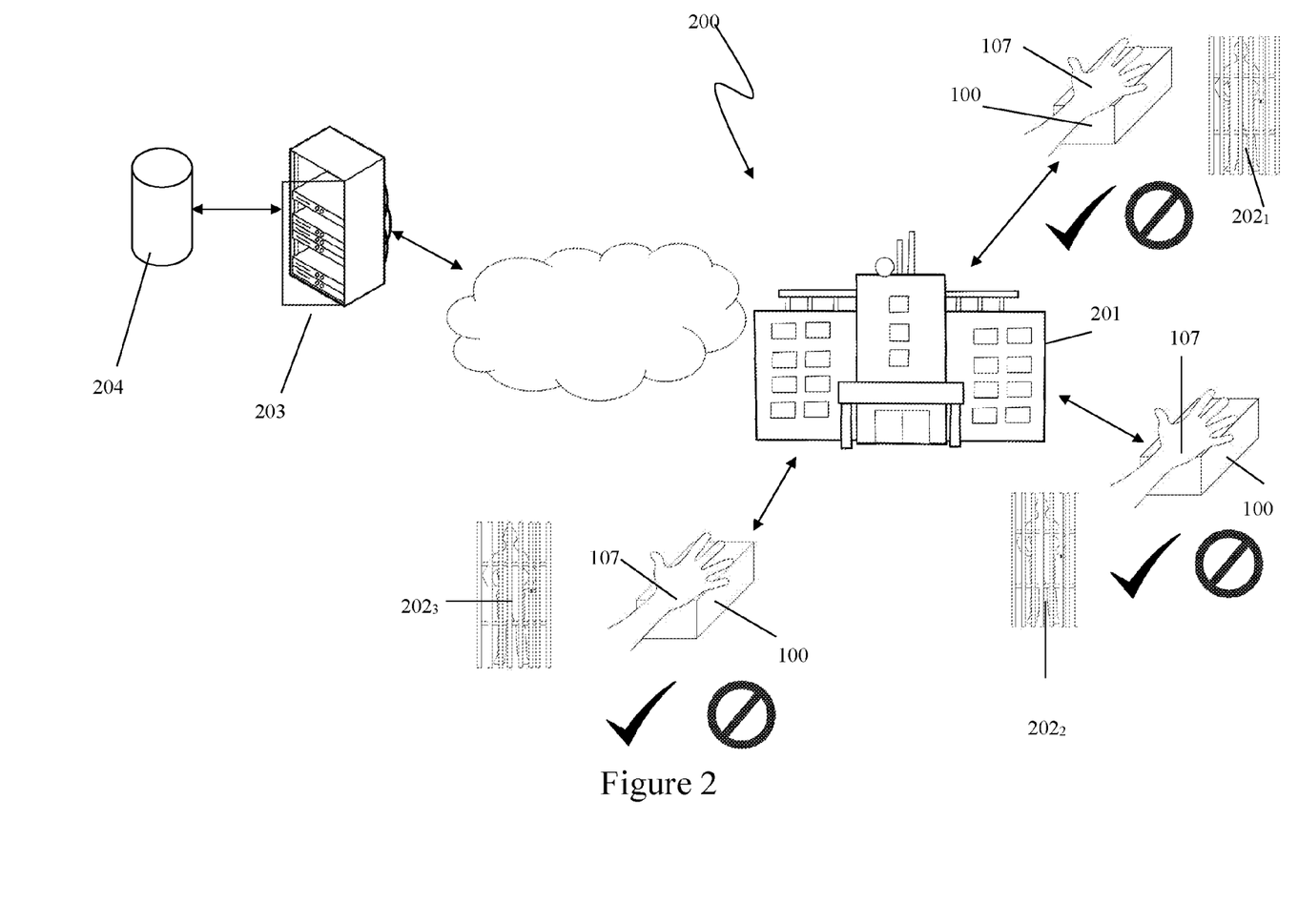
FIG. 2 is a schematic diagram depicting the use of a biometric scanner in an access control system according to one embodiment of the present invention.

FIG. 2 depicts one possible application of the biometric scanner 100 according to one embodiment of the present invention. In this example, the scanner 100 is used as part of an access control system 200 for a secure site/facility 201. As shown, scanners 100 are portioned at discrete locations $202_1$, $202_2$, $202_3$ throughout the site 201. Each of the scanners is linked via a network to a central security control server 203.

In order to gain access to the secure locations within the site, personnel 204 are required to enter a pin into the scanner or swipe an ID card to provide a first level of credentials (i.e. user ID information). Once the pin number has been entered or card has been swiped, the user is then preferably required to place their hand into the required scanner area of the relevant scanner 100. The scanner then captures an image of the vein and artery patterns within the scanned area. The user data including the scan information is then preferably encrypted and sent to the control server 203 along with information identifying the scanner and its location within the site 201.

On receipt of the scan information, the control server 203 compares the scan obtained with the scanner 100 with a template image for the given user which is retrieved from database 204 based on the user ID information presented at the commencement of the scan. The comparison could be performed in a variety of ways; for instance, the server 203 could compare the scans for the vein and artery images against template images on the system (i.e. a two pass process). Alternatively, the system could compare a single combined image against a template image (i.e. a single pass process). In one embodiment of the invention, the server could compare information relating to all three images i.e. comparison of vein and artery images separately and combined (i.e. a three pass process).

Once the control server has authenticated the user's identity, it then utilises the location information provided by the scanner to verify if the user has the required clearance to enter the location within the site 201 which they are attempting to access. If the user has the appropriate clearance then the server 203 releases any security measures (i.e. electronic door locks alarms, etc.) in place at the access point to permit the user entry to the desired location. In the event that the user does not have the proper clearances, the system does not grant them access to the desired location within the site and the attempt to gain entry is logged.

Figure 3A:
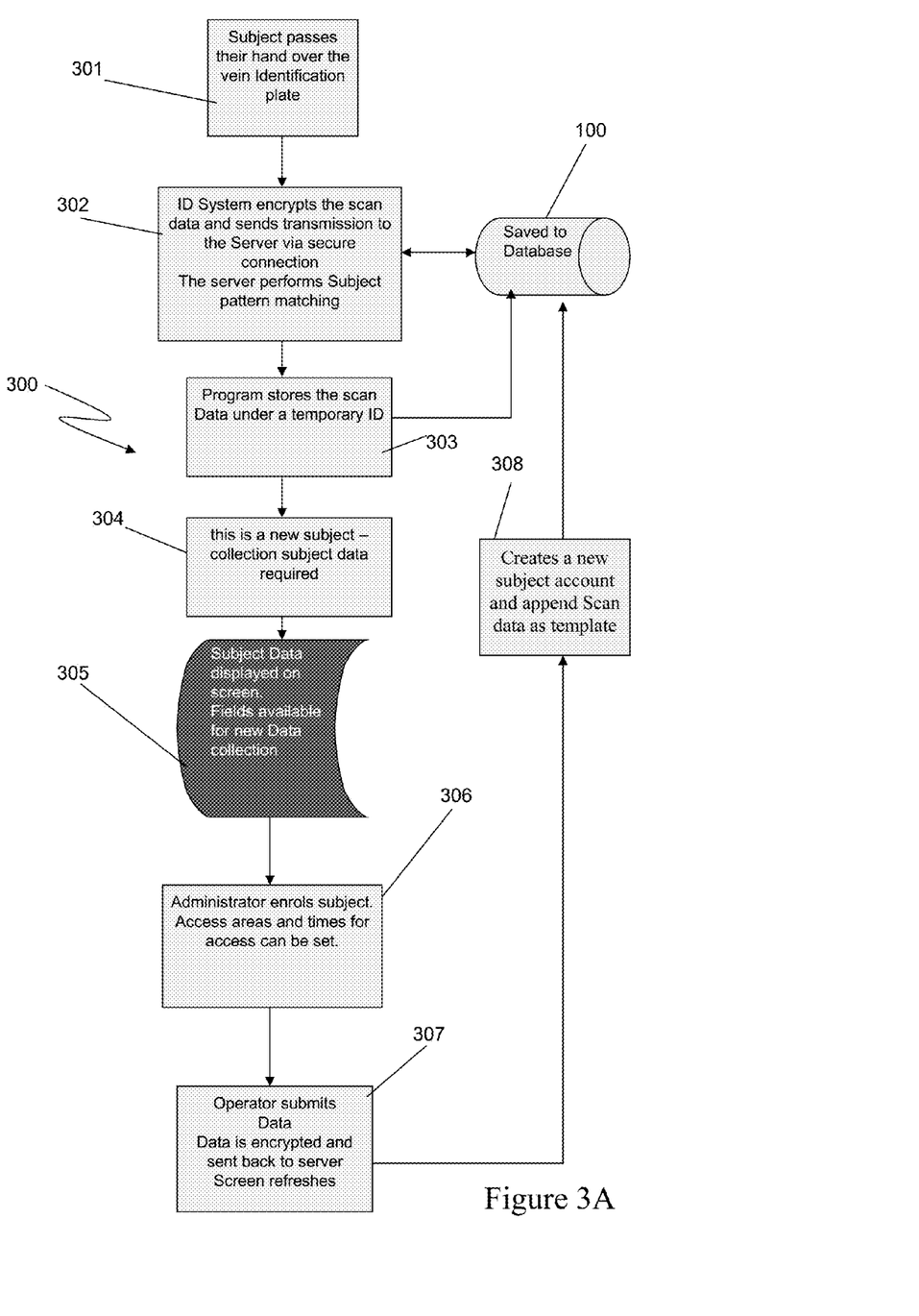
FIGS. 3A and 3B are flow charts depicting the operation of an access control system according to one embodiment of the present invention.
Figure 3B:
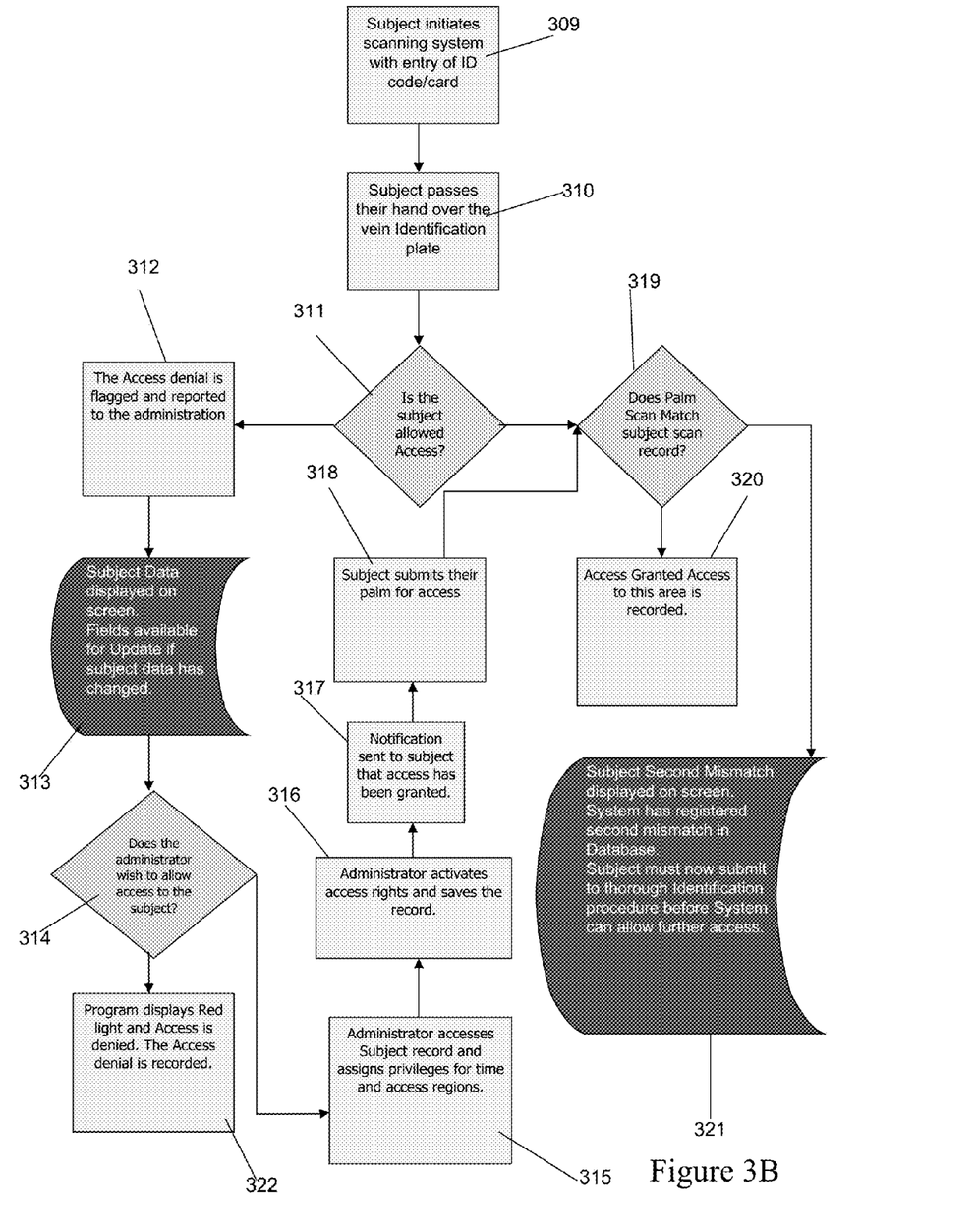

FIGS. 3A and 3B are flow charts depicting the operation of a security system employing a biometric scanner 100 according to one embodiment of the present invention. FIG. 3A depicts the enrollment process for authorised personnel 300. As shown, in order to enroll an individual into the system, the administrator requests the individual to place their palm into the scanning area of the scanner. The scanner then acquires images of the vascular and arterial patterns occurring within the user's palm. The data is then encrypted and sent to central server 301 to complete the enrollment process. On receipt of the scan data, the server then proceeds to check if the data has been previously presented 302. In the event that the data has been previously presented (i.e. user has been previously enrolled), then the system proceeds to verify the scan data and presents the system administrator with the user's account information for editing.

If the user has not previously enrolled then the system creates a new account for the user and stores the scan data under a temporary ID 303. The server then proceeds to notify the administrator that no particulars exist for the user 304 at which stage the administrator is presented with a series of electronic fields to complete 305. At this stage, the administrator completes the relevant fields including the areas which the user is entitled to access as well as the times at which they are able to access these areas 306. Once the data has been entered, the administrator submits the data to the server 307. Prior to submission, the data is preferably encrypted.

On receipt of the data, the server creates an account for the subject 308 in the database and appends the scan data stored under the temporary ID to the new account. The temporary account is then preferably cleared. Once the account has been created, the server advises the administrator of the account creation.

FIG. 3B depicts the manner in which the system may grant access to a user. As noted above, in order to initiate the access procedure, the system firstly preferably verifies if the user holds an account with the system 309. As briefly discussed above, verifying that the user holds an account with the system could be performed in a variety of ways; for example, the user may be required to enter a pin or swipe an ID card or the like. Once the system is activated, the subject is then required to present their palm for scanning 310. The system then proceeds to determine if the user has the appropriate clearances 311. If the user has the appropriate clearances, the system then determines if the scanned vein and artery print data matches the template data for the given user 319; if so then the user is granted access 320.

In the event that the user does not have the appropriate clearance then the system denies access to the given area 312. The user's attempt to access the given area is then logged and reported to the system administrator 313. The user's particulars are displayed 314 to the administrator at which time they are provided with the option 314 to allow the user access to the desired area within the site. If the administrator elects to permit the user access to the selected area the administrator accesses the user's account 315. The administrator then edits the user's access permissions and saves the updated permissions to the user's profile 316. A notification is then sent to the user that access to the desired area has been granted 317. At this stage, the system then scans the subject 318 and determines if the scanned vein and artery pattern data matches the template data for the given user 319. If the print data obtained from the scanner matches the template data then the user is granted access to the desired area 320. In the event that the data does not match the recorded template data then the system preferably registers a second mismatch (the first being the incorrect permissions) at which time the administrator is alerted to a potential security breach and the user must then be submitted to a thorough identification procedure before further access may be granted 321.

In the event that the administrator does not wish to grant access to the area which the subject is attempting to access, then the system advises the user that access is denied 322. At this stage, the subject is advised that they are not cleared to access the desired area and that they will need to contact the administrator to obtain the appropriate clearances.

Figure 4:
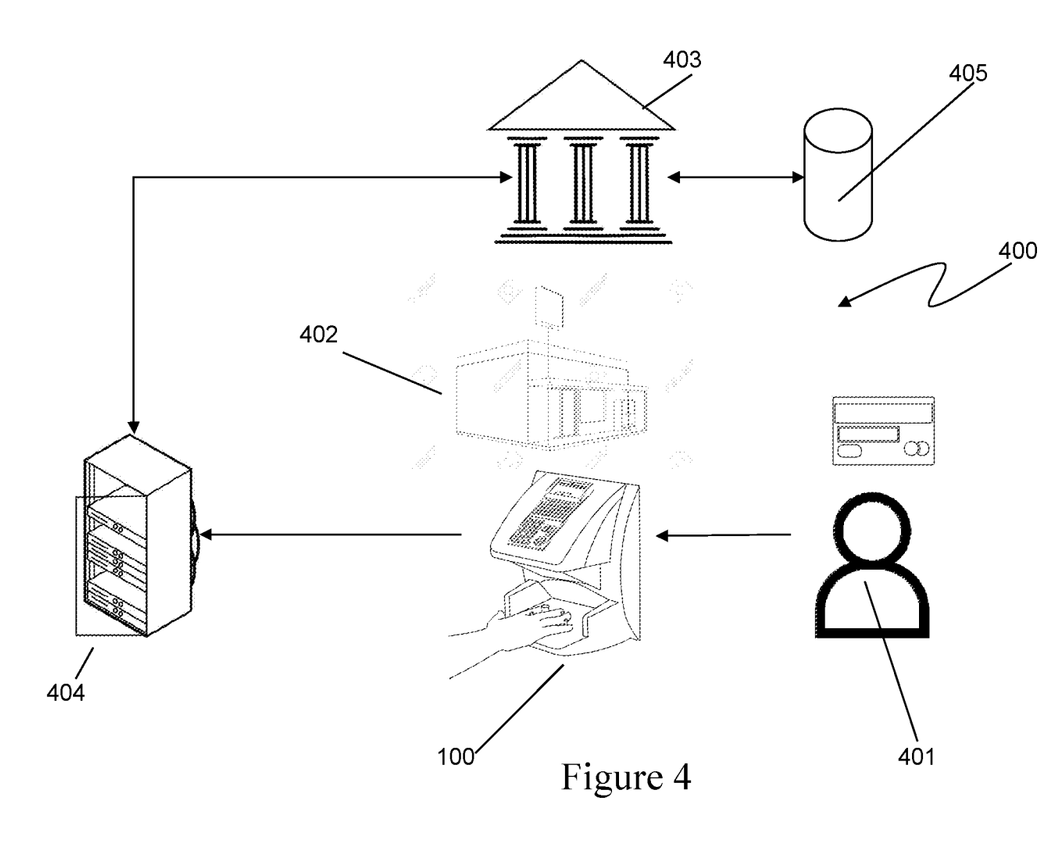
FIG. 4 is a schematic diagram depicting the use of a biometric scanner in a point of sale system according to one embodiment of the present invention.

With reference to FIG. 4, there is illustrated a system for identification and fraud prevention 400 incorporating biometric scanner 100 according to one embodiment of the present invention. In this particular example, the biometric scanner 100 is implemented as part of an electronic transaction system 400. As shown, a customer 401 wishing to purchase goods from a merchant 402 is required to present their credit/debit card issued by the relevant issuing authority 403, e.g. the customer's financial institution to initiate the transaction. The customer is then preferably required to place the palm into the scanning area of the scanner 100. The scanner then obtains the vein and artery pattern data for the customer. In this embodiment the scanner also has a card swipe and keypad incorporated. The vein and artery pattern data is then encrypted along with the customer's card/account data and sent via the merchant's payment gateway 404 to the issuing authority 403 for verification.

On receipt of the encrypted vein and artery pattern data, the issuing authority decrypts the data and compares the pattern information to the template data for the customer. In the event that the sampled pattern data matches the template data, the issuing authority signals the merchant's payment gateway 404 of the match and the payment gateway 404 proceeds to open a secure transaction channel with the issuing authority to complete the transaction. To the user, the transaction occurs as any normal EFTPOS (Electronic Funds Transfer Point Of Sale) transaction at the point of sale.

In the event of a mismatch, the merchant's payment gateway 404 may request the customer to rescan their palm to verify their identity. If the system is still unable to verify the identity of the customer, the system declines the transaction as it would a normal credit/debit card transaction (i.e. simple insufficient funds or transaction declined message). At this stage, the system may suspend/freeze the user's account or cancel the card. To unfreeze or reactivate the card, the customer would then be required to present themselves at a designated branch or the issuing authority, etc.

While in the above example the system utilises existing EFTPOS infrastructure, it will of course be appreciated by those of skill in the art that the system may also utilise devices such as smart phones, tablets or other such portable computing devices. These devices could be wirelessly tethered or docked with the appropriate scanning equipment disposed at the point of sale to complete the transaction. In such instances, the user on enrollment with the system (i.e. download and registration of an application) would be required to carry out a palm scan to enable the system to produce a template image of the vein and artery patterns in the scanned region. On completion of the registration process, the user would then be provided with a key to utilise with all future transactions. In this case the verification of the user would require the payment gateway to send the sample data from the point of sale to a third party authority for verification before opening a transaction with the customer's financial institution to complete the transaction.

Figure 5A:
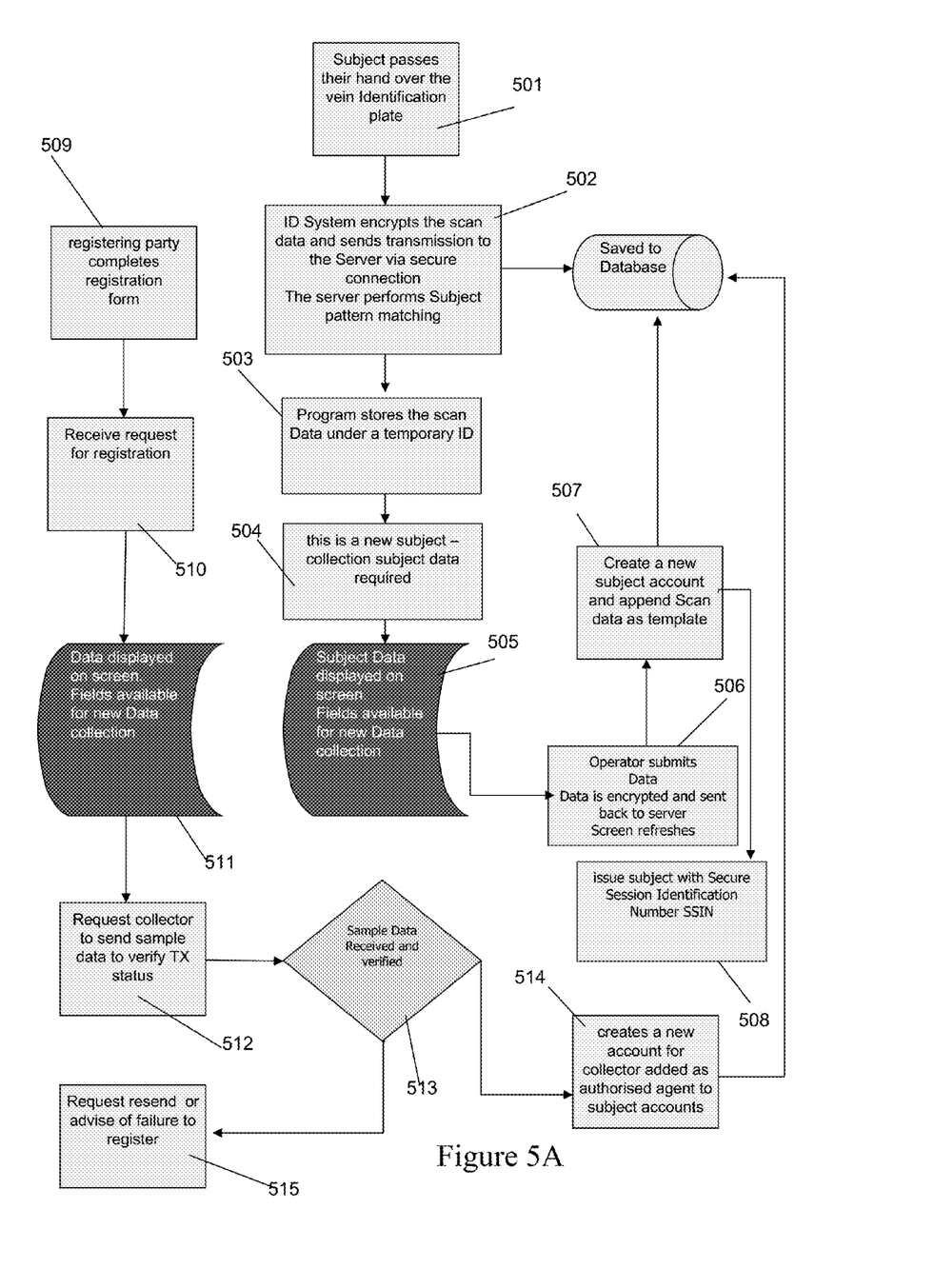
FIGS. 5A to 5C are flow charts depicting the operation of the point of sale system according to one embodiment of the present invention.
Figure 5B:
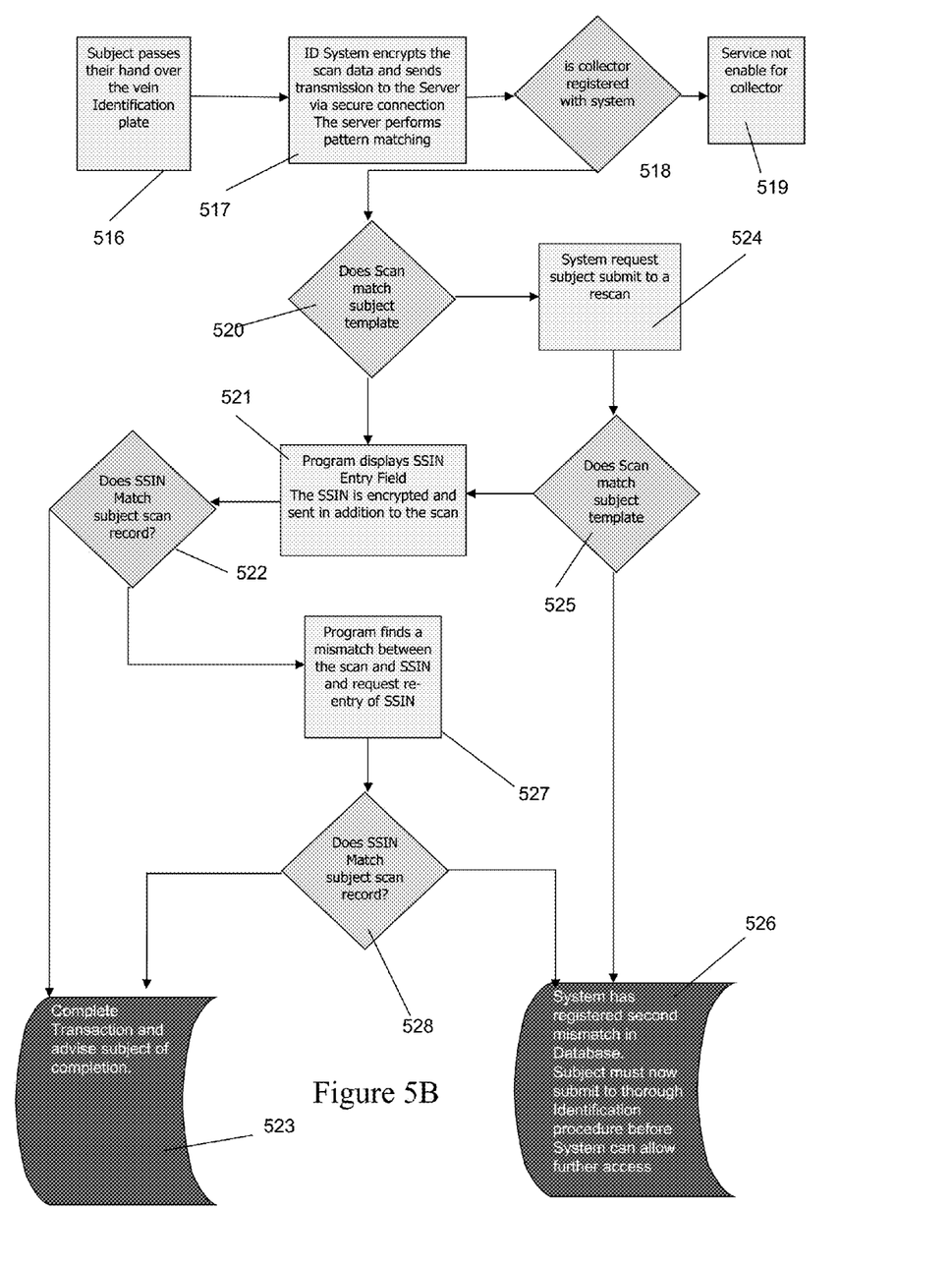
Figure 5C:
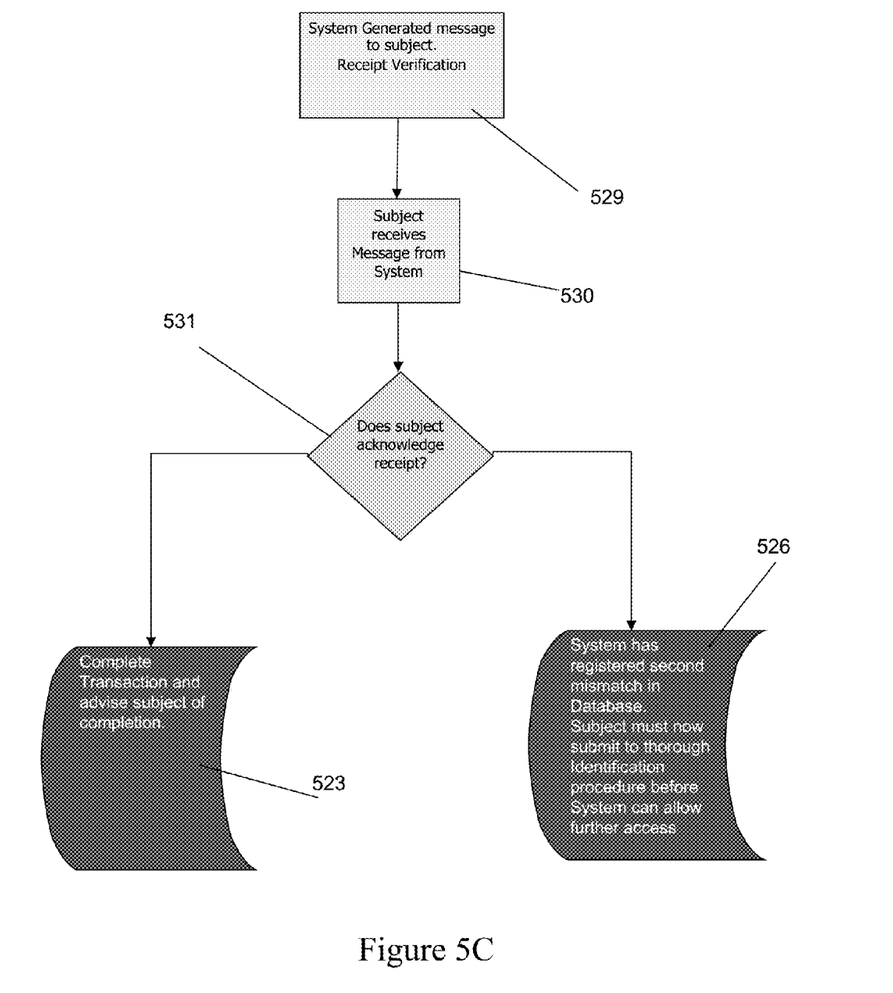

FIGS. 5A to 5C are flow charts depicting the operation of an identification fraud prevention system according to one embodiment of the present invention. With reference to FIG. 5A, there is illustrated the process of enrollment of a subject with the system. As shown, the subject is required to scan their palm 501 using a biometric scanner of the type discussed in relation to FIG. 1 above to obtain images of the underlying vein and artery patterns of the subject. The system then encrypts this information 502 and stores it under a temporary ID 503 on the system's central server. The system administrator is then advised of the new enrollment 504. The administrator is then presented with a series of data fields for completion 505. The fields in this instance are utilised to obtain personal information relating to the subject, such as name, date of birth, current address, zip/post code, phone, email, credit/debit card information, etc. Once these fields have been completed by the administrator, the data is encrypted and sent back 506 to the server. The server then creates an account for the subject 507 and assigns the scan data in the temporary ID as the template data for the subject. The account and pattern data for the subject are then stored to the systems database. The server then issues the subject with a secure session identification number (SSIN) 508 for use in all future transactions with the system.

In addition to the registration of the subjects, the system may also enable the registration of third party data collectors, which are authorised to collect pattern samples, etc. In most cases, these third party data collectors will be businesses or agencies wishing to implement additional security measures to their back-end systems. In such instances, the third party collectors may enroll in the system by completing an online registration form 509 which is then encrypted and sent to the server 510. The information is then sent to the administrator for review 511. The administrator may then request that the third party collector provide sample pattern data 512 to verify that the scan data is being sent to the system correctly 513. If the data is received as correct, the system registers the data collector 514 and assigns it as an authorised collector for all subjects enrolled in the system. If the scan data is not received correctly then the system requests the enrolling party to resend the data 515.

FIG. 5B depicts the process of verifying the identity of the subject. As shown, the user on initiating a transaction with an assigned collector is required to place their palm into the scanning area of the scanner provided at the third party data collector premises 516. The scanner then captures the images of the underlying veins in the palm and artery/arteriole dorsal surface patterns of the subject and encrypts the scan data along with data relating to the subject and the assigned collector 517. The data is then sent via secure connection to the server 517. The system proceeds to verify that the collector is registered with the system 518. If the system does not recognise the collector then the system suspends the transaction and advises the parties concerned that the service is not enabled for the selected collector 519. If the collector is registered with the system, the system then proceeds to verify the pattern data for the subject 520. If the sample data matches the template data for the given subject the system then requests the subject to enter their SSIN 521. If the SSIN matches the SSIN assigned to the subject during enrollment then the system proceeds to complete the requested transaction 523.

In the event that the system determines a mismatch between the sample scan data and the template data at step 520, the system requests the subject resubmit another scan to obtain a second sample for verification purposes 524. If the system determines that a second data mismatch has occurred 525, the system suspends the transaction and requests the user present themselves to a given location for further identification procedures 526. If the data is verified then the system request entry of the subject's SSIN 521.

If the system determines a disparity between entered SSIN and the SSIN assigned to the subject (i.e. SSIN does not match with identity derived from pattern data), the system requests the subject to re-enter the SSIN 527. At this stage, the subject could also be requested to submit to a rescan of the pattern data 524. The system then compares the resubmitted SSIN with those assigned to the subject 528. If a match is determined, the system proceeds to complete the transaction 523. If there is still a mismatch, the system suspends the transaction and requests the user present themselves to a given location for further identification procedures 526.

As will be appreciated by those of skill in the art, the purpose of rescan is to take into account any errors in the scan and/or corruption of the image data during encryption and transmission. The contact of the dorsal hand surface with the ultrasound scanner (suitably lubricated for maximum contactability) will also ensure that the infrared scanner is at the preferred distance from the palmar surface of the hand as the dimensions of the device are such that the distance is set between the two scanners. The re-entry of the SSIN is to take into account mis-keying of the SSIN by the subject, thereby reducing false positives and rejection rates of the system.

In addition to the use of the scan data and the SSIN, the system may utilise a third layer of security to ensure the integrity of the system. One example of this additional level of security is depicted in FIG. 5C. In this example, the system sends a message to the subject 529 during the transaction. The message may be in the form of an SMS, email or automated call. In each case, the subject is required to respond to the message 530. The system awaits the subject's acknowledgement of the message 531. If no response is received then the system suspends the transaction and requests the user present themselves to a given location for further identification procedures 526. If a response is received, the system proceeds with the transaction 523 as discussed above.

While the use of messaging in this example is used during the transaction as a third layer of security, it will of course be appreciated by those of skill in the art that the use of messaging could be used to verify the details of the subject on a random basis. Consequently, the system may randomly select a subject enrolled with the system. The system then sends out a message to the subject and awaits their response. If the system does not receive a response then the system suspends the user's account. On the user's next attempt to access the system, they are requested to present themselves to an identification procedure. If the system receives a response, it updates the subject account and proceeds to select the next subject for verification.

While in the above examples, capture of the pattern data is done in an overt fashion i.e. the subject is required to directly engage with the scanner, etc. It will be appreciated by those of skill in the art that the acquisition of sample data could be conducted covertly. For example, a scanner could be integrated into everyday equipment within the secure facility, etc. As a subject interacts with the piece of equipment, the scanner acquires an image of the relevant appendage of the subject i.e. palm or dorsal surface of the hand in a sanitiser device. In such instance, the scanner recognises that the palm/hand are in the required proximity to the scanner capture field and instigates a successful capture of the vessel patterns in the palm/hand.

In the case where covert capture is implemented, the system could periodically verify the location of subject persons within the facility. On determining an anomaly such as a subject being in an area they are not cleared for or the subject being in two places at once, the system could alert appropriate personnel to the relevant locations to monitor the subject and intervene where required.

The present invention may be adapted to a variety of environments. For example only, where a portion of a body has been severed, a preferred form of the present invention such as described above may be utilised to identify the severed portion as belonging to a particular individual. This has applications at accident scenes or military applications where a soldier comes into contact with a live explosive. A prior blood vessel identity scan of the individual may be used in combination with a new scan in performing a surgery to re-attach the severed portion (e.g., limbs, fingers, toes) to the individual. A similar process may be used to analyse the fluid flow from a truncated limb portion as desired or appropriate for a medical intervention, e.g., a tourniquet.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A system for biometrically authenticating the identity of a subject from a plurality of subjects, said system comprising:
    at least one scanner, said scanner for capturing information relating to a first blood vessel type and a second blood vessel type within regions of interest on each subject, the at least one scanner including:
        at least one infrared source for directing infrared radiation toward the region of interest;
        at least one infrared sensor for receiving infrared radiation reflected from said region of interest;
        at least one ultrasonic transducer for directing ultrasonic energy toward the region of interest; and
        at least one acoustic sensor for receiving ultrasonic energy reflected from said region of interest; and
    at least one processor coupled to said scanner wherein at least one processor is adapted to:
        determine the locations of blood vessels of a first vessel type within the region of interest based on the reflected infrared radiation;
        determine the locations of blood vessels of a second blood vessel type within the region of interest based on the reflected ultrasonic energy; and
        map the locations of the first and second blood vessel types within the region of interest to produce a template image of the region of interest for each subject wherein each template image includes information on the locations of the first and second blood vessel types for the subject; and
    wherein at least one processor is further configured to:
        receive from at least one scanner sample data obtained from a region of interest on a subject;

locate the positions of a first blood vessel type and a second blood vessel type within the region of interest;

generate a sample image of the region of interest including the positions of the first blood vessel type and the second blood vessel type within the region of interest; and compare the positions of the first blood vessel type and the second blood vessel type of the sample image with the positions of the first vessel type and the second blood vessel type of each template image to verify the identity of the subject.

2. The system of claim 1, wherein the ultrasonic energy is pulsed.

3. The system of claim 1, wherein the ultrasonic energy is emitted as a plurality of beams directed at differing angles to the region of interest.

4. The system of claim 1, wherein the positions of the first blood vessel type are determined by identifying one or more regions within the region of interest having the highest rate of absorption of the incident infrared radiation.

5. The system of claim 1, wherein the positions of the second blood vessel type are determined by identifying the direction and/or the rate of fluid flow through the blood vessels within the region of interest.

6. The system of claim 5, wherein directionality of the fluid flow through the blood vessels is determined utilizing Doppler shift detection.

7. The system of claim 5, wherein the rate of fluid flow through the blood vessels is determined utilizing range gating to determine fluid velocity relative to each blood vessel's cross sectional area.

8. The system of claim 1, wherein the first blood vessel type is venous and the second blood vessel type is arterial.

9. The system of claim 1, wherein the processor is coupled to a security system having one or more auxiliary devices for controlling movement of subjects between locations within the security system and wherein the processor is further configured to verify that a subject has permission to enter a location.

10. The system of claim 9, wherein the processor is configured to actuate the one or more auxiliary devices to grant the subject access to the location on determining that they have permission to enter the location and on verification of the subject identity.

11. The system of claim 1, wherein the system is integrated into a point of sale system, further comprising a plurality of said scanners and said processors, each of said scanners being positioned at various retail establishments within the point of sale system; each of said processors being configured to communicate with each retailer's payment gateway to verify the identity of a subject prior to commencement of a transaction between the payment gateway and the subject's financial institution.

12. The system of claim 1, wherein each subject is provided with a unique identification number and wherein the processor is configured to request the input of the identification number to verify the subject's identity.

13. The system of claim 1, wherein the processor is configured to send a message to the subject on access to the system, the subject being required to respond to the message before further processing of the subject commences.

14. The system of claim 1, wherein the system directs the subject to undertake a secondary identification procedure on failure to determine the subject's identity.

* * * * *